(12) United States Patent
Chong et al.

(10) Patent No.: US 12,388,474 B2
(45) Date of Patent: Aug. 12, 2025

(54) VERY SMALL APERTURE TERMINAL FOR SATELLITE COMMUNICATION WITH DIRECT CONVERSION AND ELECTRONIC POLARIZATION ORIENTATION CONTROL

(71) Applicant: Hughes Network Systems, LLC, Germantown, MD (US)

(72) Inventors: Joseph Chong, Frederick, MD (US); George Eapen, Boyds, MD (US); Rajesh Joshi, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 24 days.

(21) Appl. No.: 18/345,434

(22) Filed: Jun. 30, 2023

(65) Prior Publication Data
US 2025/0007540 A1    Jan. 2, 2025

(51) Int. Cl.
H04B 1/00    (2006.01)

(52) U.S. Cl.
CPC ......... H04B 1/0096 (2013.01); H04B 1/0028 (2013.01)

(58) Field of Classification Search
CPC ............................ H04B 1/0096; H04B 1/0028
USPC ...................................................... 455/552.1
See application file for complete search history.

(56) References Cited

U.S. PATENT DOCUMENTS

| 9,154,217 | B1 | 10/2015 | Jain et al. | |
|---|---|---|---|---|
| 2010/0017826 | A1* | 1/2010 | Fitting | H04N 21/42676 725/65 |
| 2013/0128805 | A1 | 5/2013 | Tang et al. | |
| 2015/0063428 | A1* | 3/2015 | Lever | H04B 7/18517 375/211 |
| 2016/0218797 | A1* | 7/2016 | Harrington | H04W 52/248 |
| 2020/0091622 | A1* | 3/2020 | Turpin | H01Q 5/42 |

(Continued)

FOREIGN PATENT DOCUMENTS

| WO | WO-9839851 A1 * | 9/1998 | ............ H01Q 1/246 |
|---|---|---|---|
| WO | WO-2013106779 A2 * | 7/2013 | ........... H04B 7/0613 |
| WO | WO-2021250821 A1 * | 12/2021 | ......... H04B 7/18513 |

OTHER PUBLICATIONS

Ka-Band User Terminal Antennas for Satellite Communications Hendrik Bayer, Alexander Krauss, Tobias Zaiczek, Ralf Stephan, Olaf Enge-Rosenblatt, and Matthias A. Hein (Year: 2016).*

(Continued)

*Primary Examiner* — Tanmay K Shah
(74) *Attorney, Agent, or Firm* — Kilpatrick Townsend & Stockton LLP

(57) ABSTRACT

Techniques are described for direct conversion and dynamic polarization control in a very small aperture terminal (VSAT) outdoor unit (ODU). The ODU includes a direct up-converter and/or a direct down-converter for converting in a single stage between a baseband frequency and a satellite radiofrequency band (e.g., Ka band). The ODU also includes a polarization amplifier that integrates high-power amplification with circular polarization orientation control. For example, the direct up-converter directly converts a baseband signal to a low-power satellite-RF transmit signal, and the polarization amplifier converts the low-power satellite-RF transmit signal to an uplink signal having high gain and selected circular polarization. The ODU can further include an integrated embedded computer and modem.

18 Claims, 10 Drawing Sheets

(56) References Cited

U.S. PATENT DOCUMENTS

2020/0132859 A1* 4/2020 Petrovic .............. G01S 5/0027
2021/0210855 A1  7/2021 Yue et al.
2023/0254032 A1* 8/2023 Harada ............. H04B 7/18513
                                              342/352

OTHER PUBLICATIONS

Calibrating Ka Band Satellite Down-Link Modem Measurements for Rainfall Monitoring Franz Teschl, Reinhard Teschl, Valentin Eder, Institute of Communication Networks and Satellite Communications, Graz University of Technology, Graz, Austria, Institute of Microwave and Photonic Engineering, Graz (Year: 2020).*

* cited by examiner

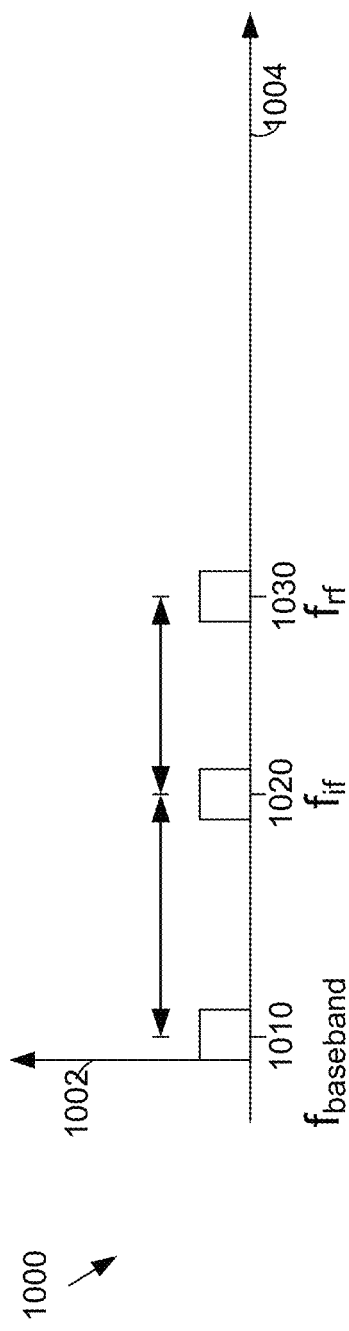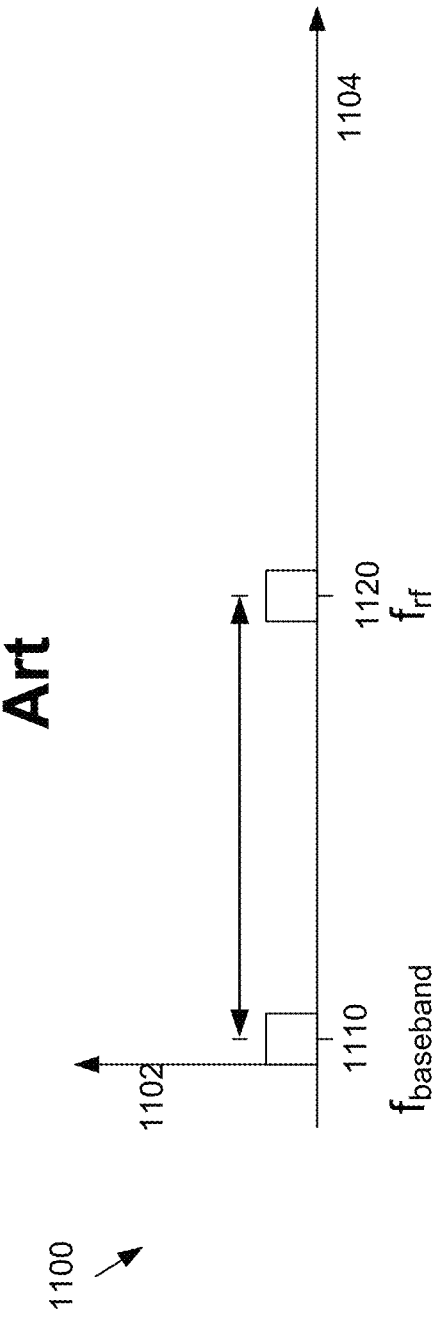

VERY SMALL APERTURE TERMINAL FOR SATELLITE COMMUNICATION WITH DIRECT CONVERSION AND ELECTRONIC POLARIZATION ORIENTATION CONTROL

BACKGROUND

Satellite communication services are typically delivered to a customer premises via a very small aperture terminal (VSAT) installed at the premises. Conventionally, the VSAT has transmit path and receive path electronics that are separated between an indoor unit (IDU) and an outdoor unit (ODU). For example, an embedded computer and modem tend to be implemented in the IDU, while radio functions (e.g., components for modulation, conversion, filtering, amplification, polarization, etc.) tend to be implemented in the ODU. Because of this separation, control signals typically need to travel through an interconnect cable, which can involve modulating and multiplexing the control signals, thereby limiting control capabilities and increasing response time.

Further, this conventional separation and/or other conventional constraints have tended to drive certain ODU radio function designs. As one example, conventional ODUs tend to have a radio function that relies on multiple conversion stages, including conversion through an intermediate frequency between baseband and satellite band. For example, ODUs tend to be designed for superheterodyne conversion. As another example, conventional ODUs tend to have a hard-wired polarization orientation. For example, changing polarization orientation of the transmit and/or receive path typically requires an installer to physically change the orientation of components, or otherwise manually reconfigure the ODU.

SUMMARY

Systems and methods are described for direct conversion and dynamic polarization control in a very small aperture terminal (VSAT) outdoor unit (ODU). The VSAT can include an embedded computer and an integrated modem. The ODU includes a direct up-converter and/or a direct down-converter for converting in a single stage between a baseband frequency and a satellite radiofrequency band (e.g., Ka band). The ODU also includes a polarization amplifier that integrates high-power amplification with circular polarization orientation control. For example, the direct up-converter directly converts a baseband signal to a low-power satellite-RF transmit signal, and the polarization amplifier converts the low-power satellite-RF transmit signal to an uplink signal having high gain and selected circular polarization. The ODU can further include an integrated embedded computer and modem.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 10 is a conventional spectral graph of multiple frequency transition stages relied on by a superheterodyne transmitter;

FIG. 11 is a graph of direct baseband-to-radiofrequency transition in a direct up-converter;

DETAILED DESCRIPTION

Figure 1:
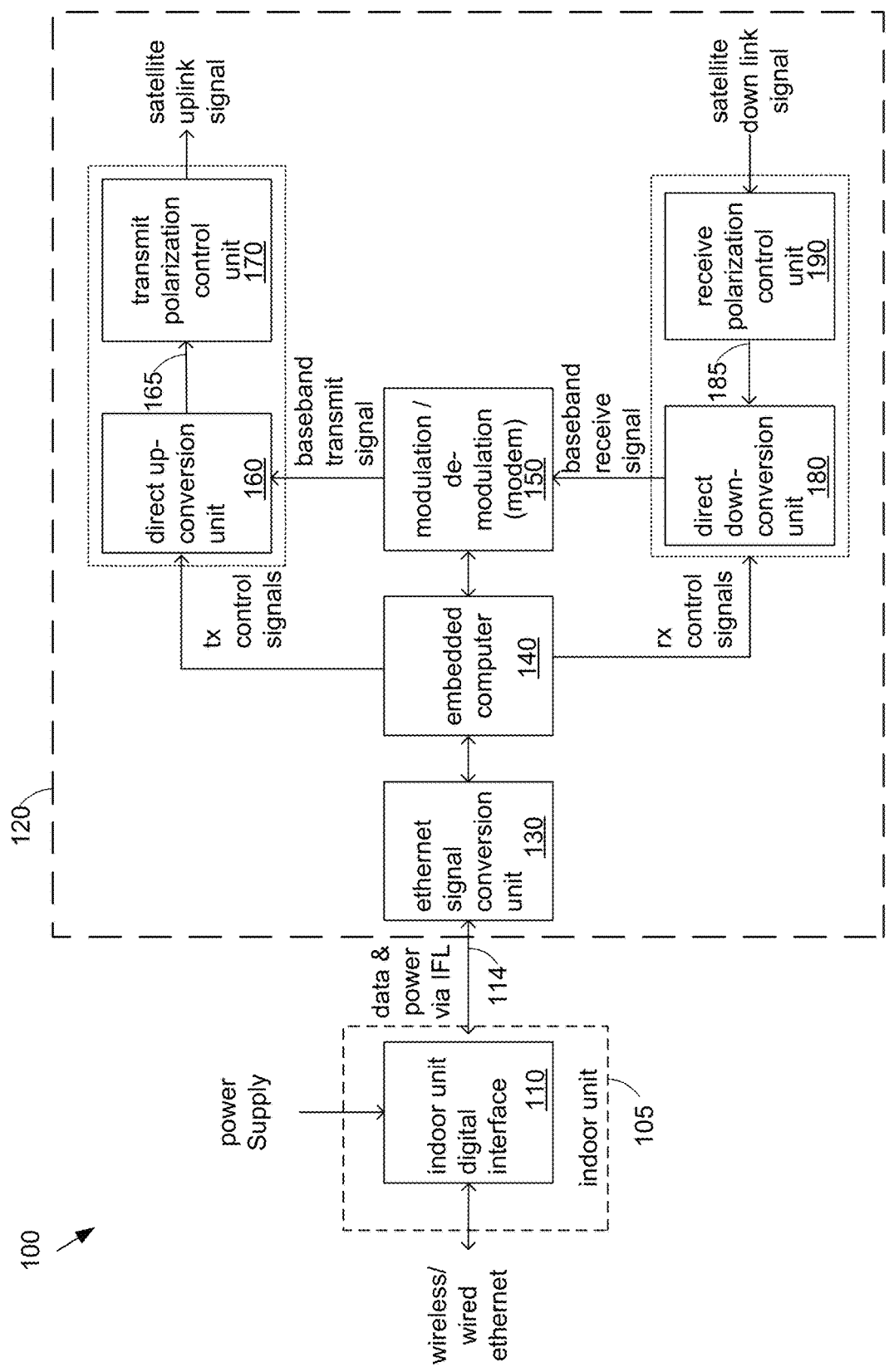
FIG. 1 is a block diagram of a very small aperture terminal (VSAT)

Disclosed embodiments relate to a very small aperture terminal (VSAT), a small-sized earth station used in the transmission and reception of data, voice, and video signals over a satellite communication network. A VSAT typically consists of two parts: a transceiver placed outdoors in direct line of sight to the satellite, and a device that is placed indoors to interface the transceiver with the end user's communications device, such as a PC. The indoor unit can interface the outdoor unit via an ethernet interface, or any other suitable interface. The transceiver receives and/or sends signals to one or more satellite transponders in the sky. The satellite(s) can further send and/or receive signals from one or more ground station computers that act as a hub for the system.

Some conventional VSAT systems utilize a superheterodyne conversion that may split conversion between the indoor unit and outdoor unit. In the receive (e.g., forward downlink) direction, a conventional, superheterodyne-based VSAT can receive a data signal from a satellite and can down-convert the signal down to an intermediate frequency fir. A modulated intermediate frequency signal can be transmitted from the outdoor unit to the indoor unit, where it can be further down-converted (i.e., down-converted a second time) to a baseband signal. The baseband signal can interface a modem that can interface an embedded computer. In the transmit (e.g., return uplink) direction, the indoor unit can take information in the form of a signal from an embedded computer through the modem and can up-convert the signal to an intermediate frequency $f_{if}$. The intermediate-frequency modulated signal can be transmitted from the indoor unit to the outdoor unit, where it can be upconverted a second time to the satellite frequency (e.g., a radiofrequency band) and interfaced to an antenna. Control signals can be passed back and forth between the indoor unit and the outdoor unit via a multiplexer and demultiplexer. For example, the indoor unit has a multiplexer that multiplexes the $f_{if}$ signal with control signals that are transmitted to the outdoor unit. The outdoor unit demultiplexes the $f_{if}$ signal from the indoor unit and separates the control signals. The outdoor unit also multiplexes a receive unit receive $f_{if}$ signal and control signals for transmit to the indoor unit. Some conventional VSATs include a waveguide to support transmitting and/or receiving in a particular circular polarization orientation. In some such conventional VSATs, an on-site technician can select a polarization orientation during installation by manually positioning (e.g., turning) waveguide components to a corresponding physical orientation. If it is desired to later reconfigure the VSAT to a different polarization orientation, the technician typically returns to the site of the VSAT to manually reposition the waveguide components in accordance with the new, desired polarization orientation.

Disclosed in embodiments is an outdoor unit (ODU) that includes direct up-conversion/down-conversion and has monotonically integrated power control with electronically switched circular polarization under software (sw) control. Embodiments of the ODU further integrate an embedded computer and a modem function. Direct up-conversion/down-conversion reduces the number of filters required. Reducing the number of filters reduces group delay and increases bandwidth. Electronically switching polarization under computer control eliminates the need for a technician to reposition waveguide.

FIG. 1 is a simplified block diagram of an illustrative embodiment of a novel VSAT 100, according to embodiments described herein. The VSAT 100 includes an indoor unit (IDU) 105 and an outdoor unit (ODU) 120. An indoor unit digital interface 110 is part of the IDU 105 and is in communication with an ODU ethernet signal conversion unit 130 of the ODU 120. The ODU ethernet signal conversion unit 130 is coupled with an embedded computer 140. The embedded computer 140 is coupled with a direct up-conversion unit 160, a direct down-conversion unit 180, and to a modulation demodulation unit (modem) 150. The modem 150 is coupled with the direct up-conversion unit 160 and is coupled with the direct down-conversion unit 180.

Embodiments of the ODU 120 has a transmit signal path and a receive signal path. In the transmit signal path, the direct up-conversion unit 160 produces a radiofrequency (rf) output signal 165 at low power. The rf output signal 165 is passed to a transmit polarization control unit 170 which amplifies with high gain the rf output signal 165 and controls its polarization orientation. The transmit polarization control unit's 170 output is the satellite uplink signal or uplink signal which interfaces an antenna (not shown). In the receive signal path, the same or a different antenna (not shown) is coupled with a receive polarization control unit 190 to receive a satellite downlink signal (or downlink signal). The receive polarization control unit 190 outputs a amplified satellite-RF receive signal 185 to the direct down-conversion unit 180.

Embodiments of the ODU 120 receive data and power over an interfacility cable (IFL) 114. The IFL cable 114 can be implemented to use a Multimedia over Coax Alliance (MoCA) protocol so that data and power are received from the indoor unit digital interface 110 and data from the ODU 120 are supplied back to the indoor unit digital interface 110. The data that is received from the indoor unit digital interface 110 is converted by the ODU ethernet signal conversion unit 130 and passed to the embedded computer 140. Data from the embedded computer 140 is also passed back to the ODU ethernet signal conversion unit 130, which in turn passes data back to the indoor unit digital interface 110.

During transmit operation, the embedded computer 140 receives the ethernet signal from the ODU ethernet signal conversion unit 130 and feeds them to the modem unit 150 and subsequently to the direct up-conversion unit 160. The direct up-conversion unit 160 may also be called a "direct up-converter." The tx control signals can be generated by the embedded computer 140 to control the direct up-conversion unit 160, such as to set the frequency at which the direct up-conversion unit 160 modulates the baseband (BB) transmit signal. For example, the embedded computer 140 can control the value of the rf frequency at which the signal will be transmitted to the satellite. In some implementations, the embedded computer 140 can also use the tx control signals to set compensation such as pre-emphasis, scale the output to reduce noise, and/or set the circular polarization orientation of the transmit signal.

As part of the transmit signal path, the embedded computer 140 can also forward multiplexed transmit data and send the multiplexed transmit data to the direct up-conversion unit 160 through a modem 150. The output from the up-conversion unit 160, which is the rf output signal 165, is fed into the transmit polarization control unit 170 that amplifies the signal and that sets the polarization orientation to either right-hand circular polarization (RHCP) or left-hand circular polarization (LHCP). The polarization orientation can be set by the tx control signals from the embedded computer 140.

During receive operation, the embedded computer 140 receives the signal from the modem unit 150, which receives the signal from the direct down-conversion unit 180. The direct down-conversion unit 180 may also be called a "direct down-converter." The rx control signals can control the direct down-conversion unit 180, such as by setting the frequency at which the direct down-conversion unit 180 modulates the receive signal so that it operates at the correct frequency. The embedded computer 140 can also set compensation, such as by setting de-emphasis scaling to reduce noise and/or by setting the circular polarization orientation of the receive signal.

As part of the receive signal path, a satellite receive signal is received from a satellite by the receive polarization control unit 190. The receive polarization control unit 190 contains a low noise amplifier and sets the receive polarization orientation to be RHCP or LHCP. The polarization orientation is set by the embedded computer 140. The output of the receive polarization control unit 190, which is the amplified satellite-RF receive signal 185, is fed into the direct down-conversion unit 180. The received, down-converted data signal is passed to the modem 150 and then to the embedded computer 140. The polarization orientations of the transmit and receive signal can each be set separately by the embedded computer 140.

Figure 2:
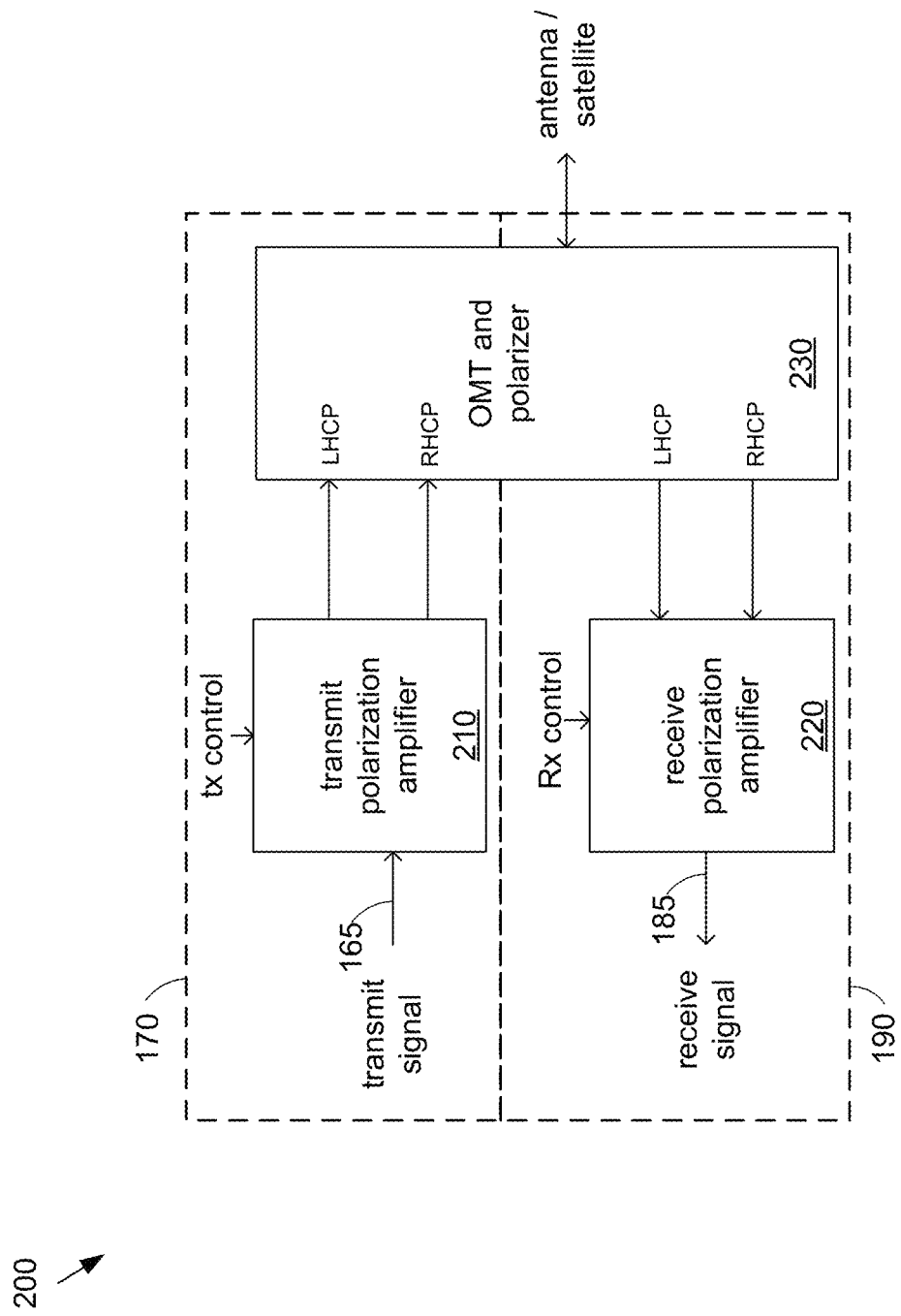
FIG. 2 Is a block diagram of a polarization control unit.

FIG. 2 is a block diagram of a polarization control unit 200. The polarization control unit 200 comprises the transmit polarization unit 170 and the receive polarization control unit 190. Embodiments of the polarization control unit 200 can be an implementation of the transmit polarization control unit 170 and the receive polarization control unit 190 of the VSAT 100 of FIG. 1. In a transmit direction, rf output signal 165 (also referred to herein as a low-power satellite-RF transmit signal) is fed into a transmit polarization amplifier 210. The transmit polarization amplifier 210 is a dual power amplifier configured to drive one of two selectable outputs integrated into a single monolithic Integrated Circuit (IC). The two selectable outputs of the transmit polarization amplifier 210 are fed into respective inputs of a polarizing Orthomode Transducer (OMT) 230. The two inputs to the polarizing OMT 230 correspond to a LHCP input and an RHCP input. The transmit polarization amplifier 210 only drives one of its selectable outputs at a time, thereby also driving the corresponding one of the inputs to the polarizing OMT 230. When the transmit polarization amplifier 210 drives the LHCP input to the polarizing OMT 230, this causes the polarizing OMT 230 to output a signal with a LHCP polarized output. When the transmit polarization amplifier 210 drives the RHCP input the polarizing OMT 230, this causes the polarizing OMT 230 to output a signal with a RHCP polarized output. The signal output by the polarizing OMT 230 is referred to herein as the uplink signal.

In a receive direction, the receive signal (also referred to herein as the downlink signal) is fed into the polarizing OMT 230 which outputs two signals of different circular polarization orientations. Those signals are fed into two respective inputs of a receive polarization amplifier 220. Each input of the receive polarization amplifier 220 can be fed into a separate low noise amplifier LNA of the receive polarization amplifier 220. One LNA amplifies the LHCP output of the polarizing OMT 230, and a second LNA amplifies the RHCP output of the polarizing OMT 230. As described herein, control signals can be used to select which LNA is active. In some implementations, rx control signals are used to select whether the receive polarization amplifier 220 will connect its output to the LNA that is amplifying the LHCP output of the polarizing OMT 230 or to the LNA that is amplifying the RHCP output of the polarizing OMT 230. In this way, for example, rx control signals to set whether the receive polarization amplifier 220 will output an LHCP polarized output or an RHCP polarized output. The output of the receive polarization amplifier 220 is referred to herein as a amplified satellite-RF receive signal 185.

The path for both the transmit and receive and can be separately controlled by the control signals (e.g., by the tx and rx control signals, respectively). For example, control signals are used to select polarization orientations in the transmit and/or receive directions. In some embodiments, the polarization control unit 200 is part of an ODU of a VSAT, such as the one described with reference to FIG. 1. In such embodiments, the embedded computer in the VSAT (e.g., embedded computer 140 of FIG. 1) can provide the control signals to control which output of the transmit polarization amplifier 210 and/or receive polarization amplifier 220 is driven, thereby selecting polarization orientation of the transmit and/or receive signal.

Figure 3:
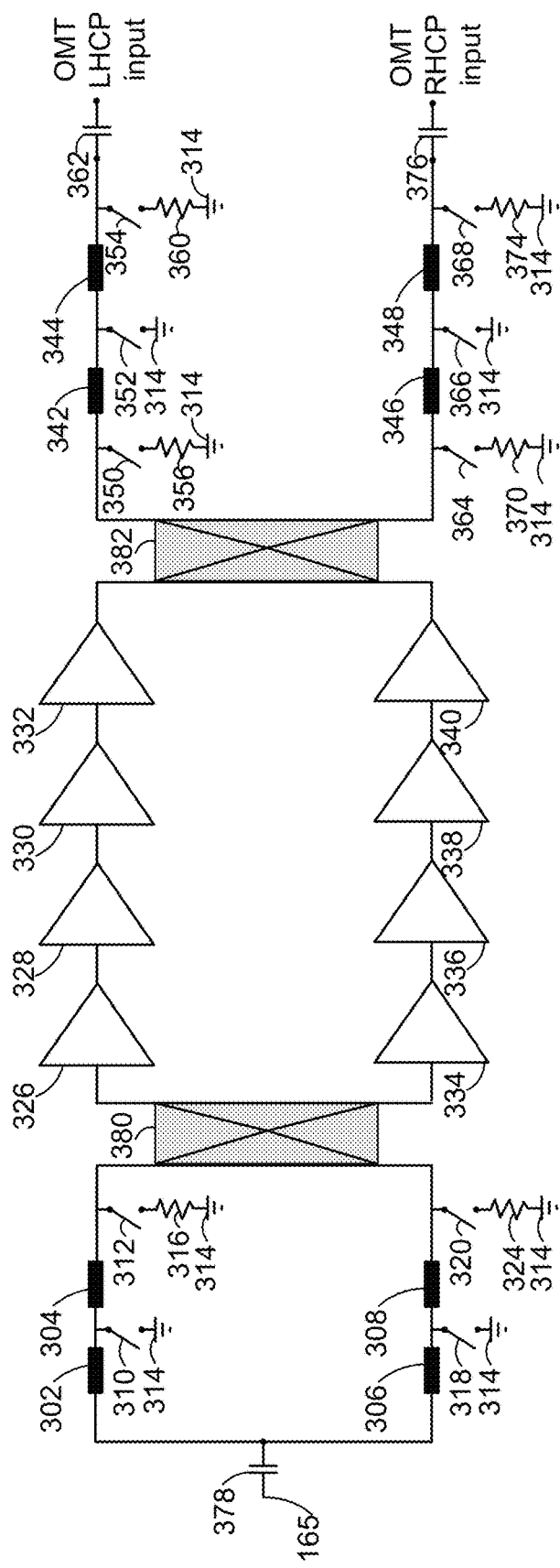
FIG. 3 is a schematic of a transmit polarization amplifier.

FIG. 3 is a simplified schematic of an illustrative embodiment of the transmit polarization amplifier 210 of FIG. 2. The schematic includes an input stage, an amplifier stage, and an output stage, each having two parallel paths. In the input stage, the rf output signal 165 is coupled with an input capacitor 378. The other end of input capacitor 378 coupled with two inputs of a first Lange coupler 380 via respective parallel input paths. In one parallel input path, input capacitor 378 is coupled with one end of 90 degrees phase shifter 302. The other end of 90 degrees phase shifter 302 is connected in parallel to one end of 90 degrees phase shifter 304 and to switch 310 that couples with ground 314. The other end of 90 degrees phase shifter 304 is connected in parallel to switch 312 and to one input of the first Lange coupler 380. The switch 312 couples with ground 314 via a resistor 316. In the other parallel input path, input capacitor 378 is coupled with one end of 90 degrees phase shifter 306. The other end of 90 degrees phase shifter 306 is connected in parallel to one end of 90 degrees phase shifter 308 and to ground 314 via switch 318. The other end of 90 degrees phase shifter 308 couples in parallel to switch 320 and to the other input of the first Lange coupler 380. Switch 320 couples with ground 314 via resister 324. In some embodiments, the parallel input paths of the input stage are nominally identical.

In the amplifier stage, the first Lange coupler 380 couples with a second Lange coupler 382 via two parallel amplifier paths. Each amplifier path is made up of gain stages. In one parallel amplifier path, a first output of the first Lange coupler 380 is coupled with a first input of the second Lange coupler 382 via a first series of gain stages 326, 328, 330, and 332. While four gain stages are shown, any suitable number of gain stages can be used in the string. The gain stages can be nominally identical to each other. In the other parallel amplifier path, a second output of the first Lange coupler 380 is coupled with a second input of the second Lange coupler 382 via a second series string of gain stages 334, 336, 338, and 340. While four gain stages are shown, any suitable number of gain stages can be used in the string. The amplifiers can be nominally identical to each other. In some embodiments, the parallel amplifier paths of the amplifier stage are nominally identical.

In the output stage, each of two outputs of the second Lange coupler 382 drives a respective one of two parallel output paths. In one parallel output path, the first output of Lange coupler 382 is connected in parallel to switch 350 and to one end of 90 degrees phase shifter 342. The switch 350 couples with ground 314 via resistor 356. The other end of 90 degrees phase shifter 342 is connected in parallel to one end of 90 degrees phase shifter 344 and to switch 352, which couples with ground 314. The other end of 90 degrees phase shifter 344 is connected in parallel to switch 354 and to output capacitor 362. The switch 354 couples with ground 314 via resister 360. In the other parallel output path, the second output of Lange coupler 382 is connected in parallel to switch 364 and to one end of 90 degrees phase shifter 346. The switch 364 couples with ground via resistor 370. The other end of 90 degrees phase shifter 346 is connected in parallel to one end of 90 degrees phase shifter 348 and to switch 366, which couples with ground 314. The other end of 90 degrees phase shifter 348 is connected in parallel to switch 368 and to output capacitor 376. The switch 368 couples with ground via a resister 374. Output capacitor 362 drives an LHCP output, and output capacitor 376 drives an RHCP output.

The transmit polarization amplifier 210 is a power amplifier with two amplifier paths driving one of two outputs. The outputs as mentioned will drive the LHCP or RHCP output. The illustrated architecture, including parallel signal paths bridged by a pair of Lange couplers, allows directing the high-power output to one of two outputs without having a mechanical or a semiconductor switch in series with the signal path, thereby reducing signal loss and noise. In some embodiments, the two amplifier paths are on a monolithic IC. Each amplifying path has a high gain (e.g., in excess of 27 dB, as described below). The transmit polarization amplifier 210 amplifies the output of the direct up-conversion unit 160. The output of the direct up-conversion unit 160 is at low power. Low power allows the signal processing within the direct up-conversion unit 160 to be achieved with a technology that can be integrated on a single monolithic IC. Because of the low-power output of the direct up-conversion unit 160, the transmit polarization amplifier 210 is designed in a novel manner to produce sufficiently high gain to support satellite transmission of the signal.

In some embodiments, the transmit path is designed to operate linearly with an output of approximately 35 decibel-milliwatts (dBm) (indicating the power level as expressed in decibels with reference to one milliwatt). The direct up-conversion unit 160 is implemented on a monolithic IC using silicon-germanium (SiGe) technology. To maintain linear operation of the SiGe monolithic IC, the direct up-conversion unit 160 is designed to operate at least 10 dB below the 1 dB compression point. In one implementation, the direct up-conversion unit 160 is operated at 7 dBm (10 dB below 1 dB compression point of 17 dBm). After approximately 2 dB of on-board losses, the transmit polarization amplifier 210 receives at approximately 5 dBm. To achieve the desired output of approximately 35 dBm, the transmit polarization amplifier 210 is designed to apply 30 dB of gain to the signal. If the on-board losses are reduced to 1 dB, the transmit polarization amplifier 210 receives at approximately 6 dBm, and the transmit polarization amplifier 210 can be designed to apply only 29 dB of gain to the signal.

The switches in the input and output stages are set to determine through which path the output power will flow. The switches are not in series with the power flow. After the switches in the input stage, the power is divided by the first Lange coupler 380 into the two parallel amplifier paths, such that each path carries a power signal of equal power and the power signals are out of phase. The two power signals are then recombined by the second Lange coupler 382.

Figure 4:
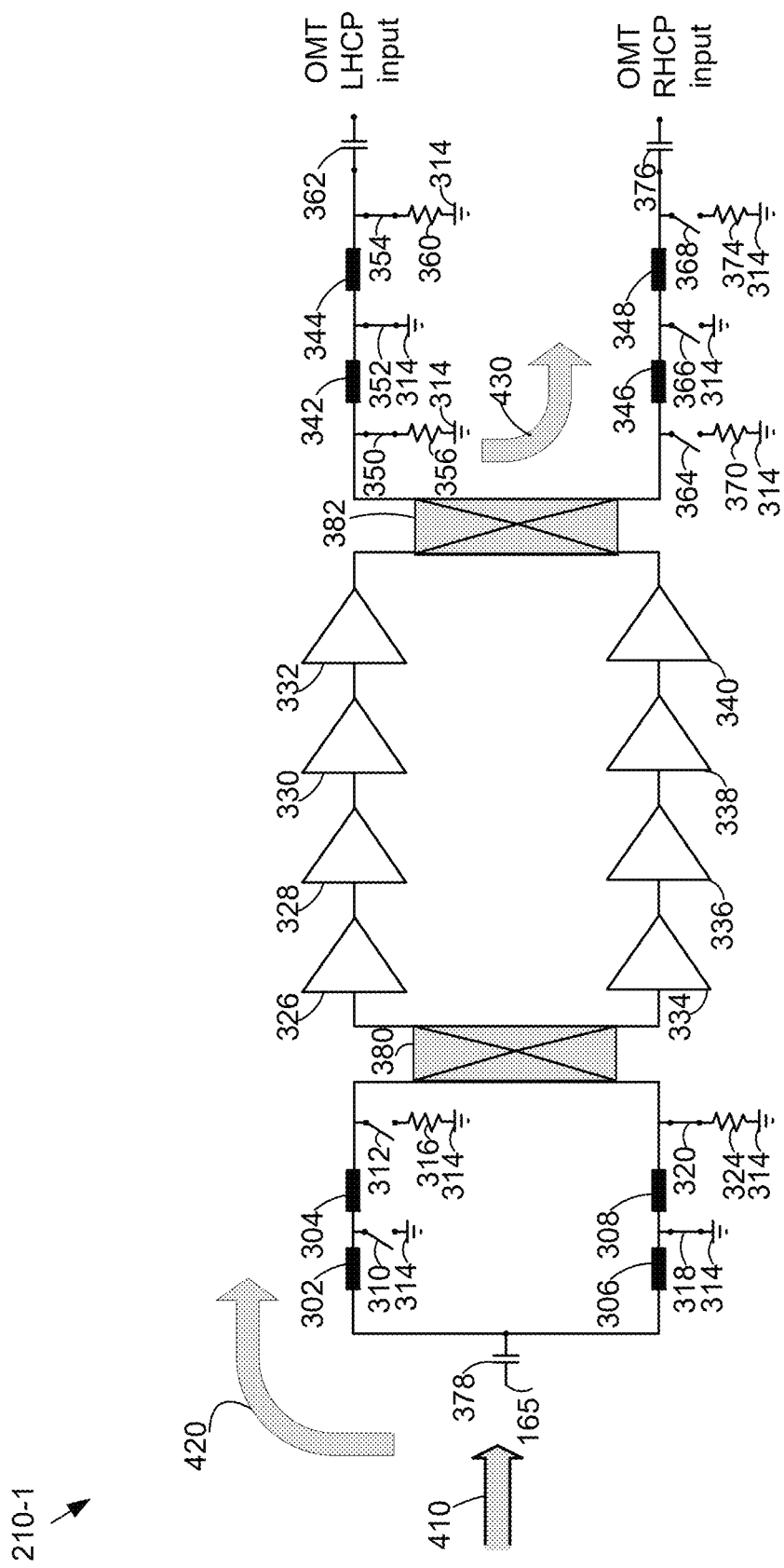
FIG. 4 illustrates the power flow that drives the right-hand circular polarization (RHCP) output to the orthomode transducer (OMT) left-hand circular polarization (LHCP) input.

FIG. 4 illustrates an example of a power flow that drives the RHCP output 210-1. The circuit is identical to the transmit polarization amplifier 210 circuit illustrated in FIG. 3, and the same reference designators are used, except as explicitly described. In the input stage, switches 318 and 320 are closed and switches 310 and 312 are open. Power enters through capacitor 378 in the direction indicated by arrow 410 and is steered via the first Lange coupler 380 through the top layer of gain stages 326, 328, 330, and 332 in the direction indicated by arrow 420. In the output stage, switches 350, 352, and 354 are closed; and switches 364, 366, and 368 are open. The second Lange coupler 382 steers the power to the bottom in the direction indicated by arrow 430 through 90 degrees phase shifter 346 and 348 to drive the RHCP output.

Figure 5:
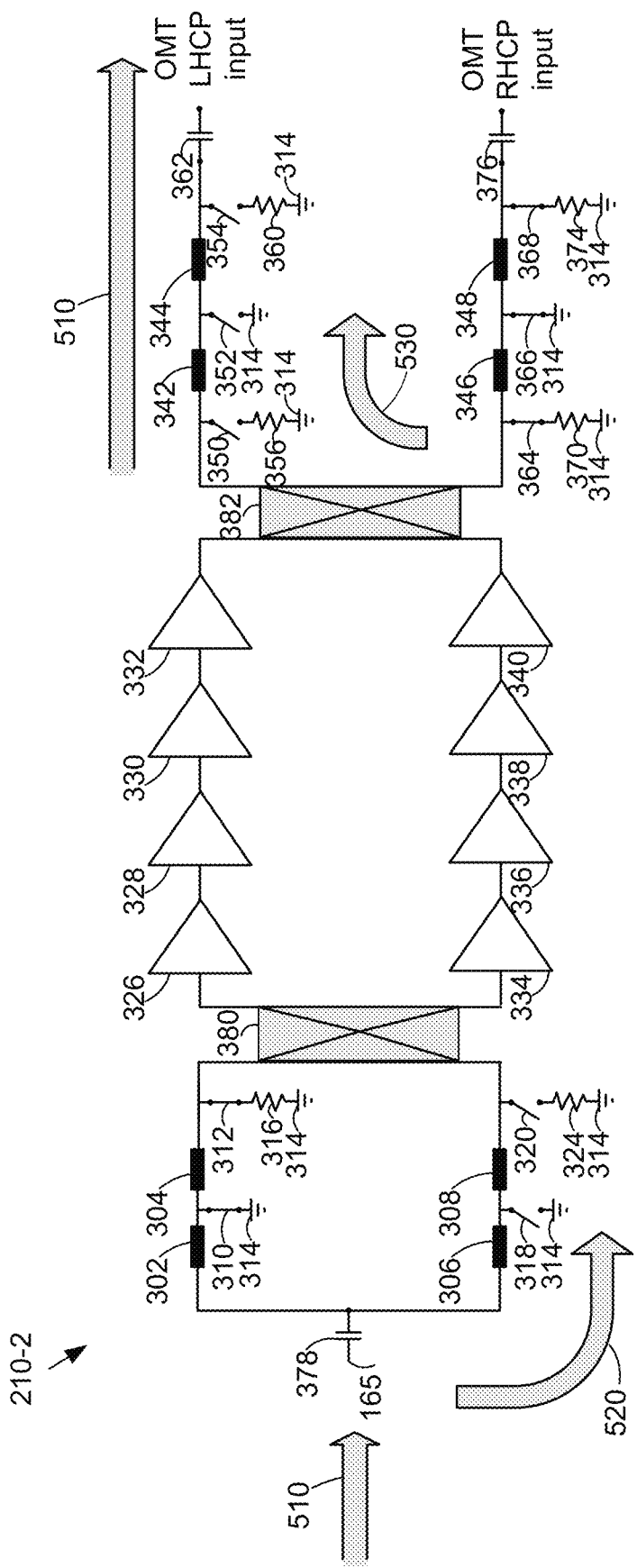
FIG. 5 illustrates the power flow that drives the LHCP output to the OMT RHCP input.

FIG. 5 illustrates the power flow that drives the LHCP output 210-2. Switches 310 and 312 are closed. Switches 318 and 320 are open. Power enters through capacitor 378 in the direction 510 and is steered through the bottom layer of amplifiers 334, 336, 338, and 340 in the direction 520. The switches 350, 352, and 354 are open. Switches 364, 366, and 368 are closed. The Lange coupler 382 steers the power to the top in the direction 530 through 90 degrees phase shifter 342 and 344 to drive the LHCP output.

Figure 6:
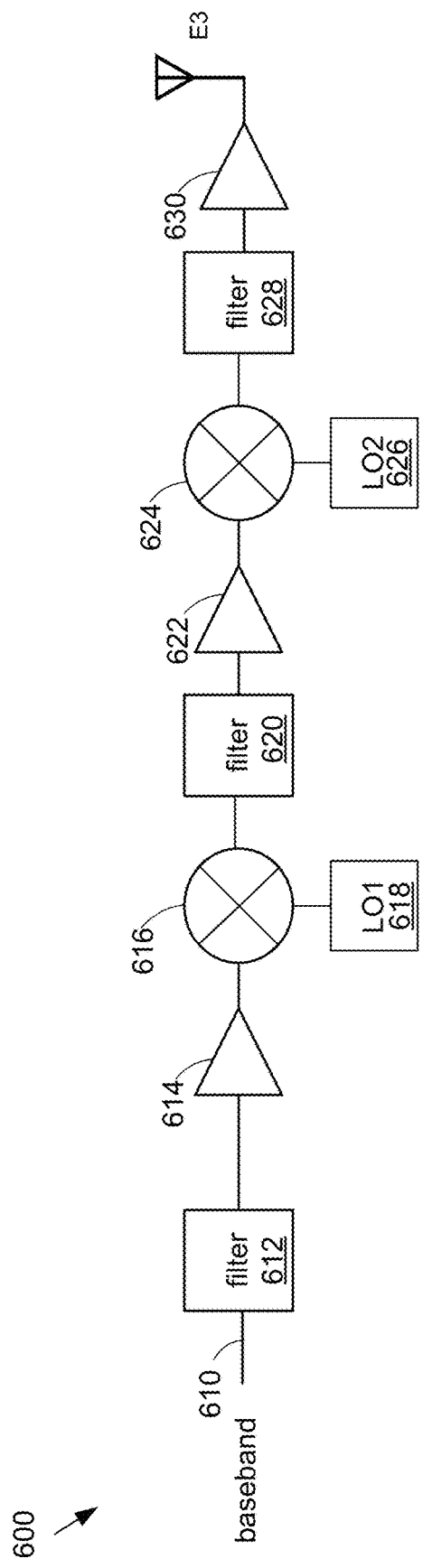
FIG. 6 is a block diagram of a conventional two stage up-converter also known as a superheterodyne transmitter.

FIG. 6 is a block diagram of a conventional two stage up-converter also known as a superheterodyne transmitter 600. The superheterodyne transmitter 600 has two conversion stages: a first stage to convert from baseband to an intermediate frequency, and a second conversion stage to convert from the intermediate frequency to a satellite rf frequency. For example, the superheterodyne transmitter 600 of FIG. 6 includes two mixers 616, 624 to perform the two conversions. Baseband inputs at 610 couples with a filter 612 that is coupled with an amplifier 614. The output of amplifier 614 is coupled with a mixer 616 that is also coupled with a first local oscillator (LO1) 618. The output of the mixer 616 is filtered by filter 620. The output of filter 620 is amplified by an amplifier 622 which in turn is coupled with a second mixer 624 which is also coupled with a second local oscillator (LO2) 626. The output of the mixer is coupled with the filter 628 and the output of 628 is coupled with a power amplifier 630 which in turn drives an antenna.

Each of mixers 616, 624 classically is a nonlinear device. It takes the sum of the two signals and squares it. The squaring produces the square of each signal, doubling their frequency and the product of the two signals. The squaring requires the output of the mixer be filtered so that the higher order terms and the lower order terms are rejected. In a fully digital system, a nonlinear device may not be used. However, DC offsets, which can be in the mixer output, need to be filtered as well as other digital mixer effects. For example, filtering after mixer 616 is performed by filter 620. The output of filter 620 is a signal that is equivalent to the output of amplifier 614 but shifted in frequency to the frequency of LO1 618. This frequency is referred to as the intermediate frequency $f_{if}$. This is the first conversion stage to convert from baseband to $f_{if}$. The output of filter 620 is then amplified by amplifier 622 and fed into the second mixer 624, which mixes the signal with the LO2 626. LO2 626 mixes to a satellite rf frequency. The second mixer 624 output also requires filtering to remove the excess mixing products, which is performed by filter 628. This is the second conversion stage to convert from $f_{if}$ to the satellite rf band. The final stage is a power amplifier 630 that amplifies the output of filter 628 and drives an antenna.

Figure 7:
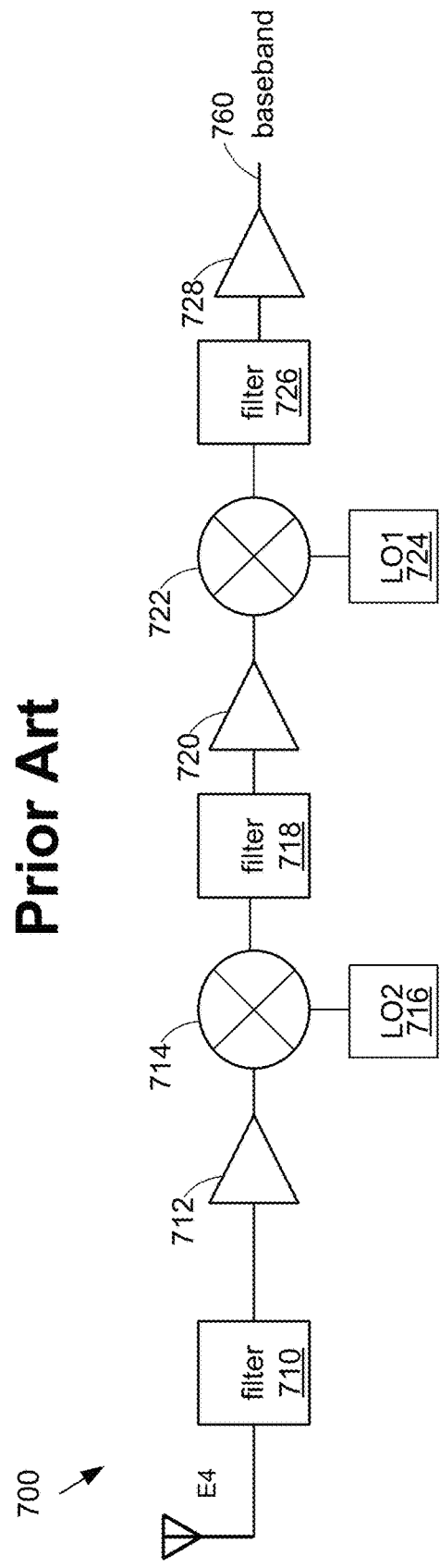
FIG. 7 is a conventional block diagram of a superheterodyne receiver.

FIG. 7 is a conventional block diagram of a superheterodyne receiver 700. The superheterodyne receiver 700 has two conversion stages: a first stage to convert from rf to an intermediate frequency, and a second conversion stage to convert from the intermediate frequency to baseband. For example, the superheterodyne transmitter 700 of FIG. 7 includes two mixers 714, 724 to perform the two conversions. Rf energy is received by an antenna and filtered by filter 710. The filter 710 output is amplified by an amplifier 712. The amplifier 712 drives its output into mixer 717 which is also coupled with a local oscillator L02 716. The output of the mixer 714 is coupled with filter 718 which in turn is coupled with amplifier 720. The output of amplifier 720 is coupled with mixer 722. The mixer 722 is also coupled with an oscillator L01 724. The output of mixer 722 is coupled with filter 726. The output of filter 726 is coupled with amplifier 728. The output of amplifier 728 is at baseband.

The superheterodyne receiver 700 operates by filtering the input from the antenna as a preselector, which is filtered by filter 710. Filter 710 may incorporate a low noise amplifier. A preselector narrows the rf frequency bandwidth to be processed. The output of the filter 710 is amplified by a low noise amplifier 712. The output of the amplifier 712 drives an input to a mixer 714 which mixes the signal with LO2 716 shifting the frequency down by the frequency of L02 716 producing a signal at an intermediate frequency. This is the first conversion stage to convert from $f_{rf}$ to $f_{if}$. The mixer outputs are filtered to remove mixing products and is performed by filter 718. The output of filter 718 is amplified by amplifier 720. The output of amplifier 720 drives a second mixer 722 which mixes the signal with local oscillator L01 724. This is the second conversion stage to convert from $f_{if}$ to baseband. The output of the mixer 722 is filtered which is performed by filter 726 and then amplified by amplifier 728. The output of amplifier 728 is 760 and is at baseband frequency. In both the transmit and receive the conversion is done in two stages.

Figure 8:
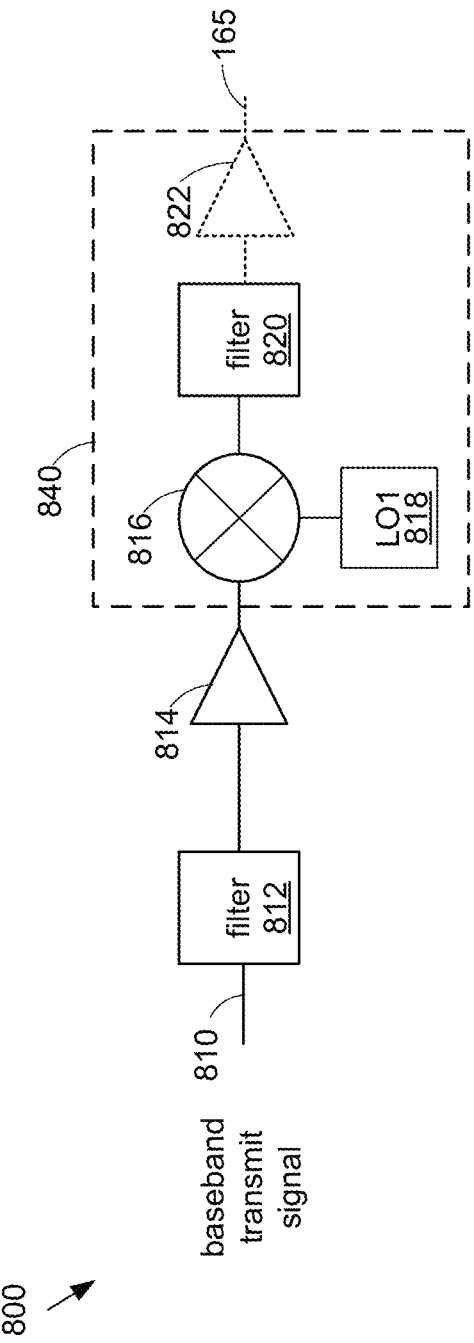
FIG. 8 shows a block diagram of a direct up-converter.

FIG. 8 shows a simplified block diagram of an illustrative embodiment of a direct up-converter (DUC) 800. The illustrated direct up-converter 800 can be an implementation of the direct up-conversion unit 160 of FIG. 1. It can be seen that the direct up-converter 800 includes only a single conversion stage that converts directly from baseband to a satellite rf band without any intermediate conversion to $f_{if}$. The baseband transmit signal 810 is coupled with a filter 812. The output of filter 812 is coupled with an amplifier 814. The output of amplifier 814 is coupled with a mixer 816. The mixer 816 is coupled with a local oscillator (LO1) 818, and the output of the mixer 816 is coupled with filter 820. The functions of mixer 816, LO1 and filter 820 reside on a single monolithic IC 840, which outputs a low-power satellite-RF transmit signal, also referred to herein as rf output signal 165. In some implementations, the output of filter 820 is passed through an amplifier 822. Amplifier 822 can buffer the output (e.g., for impedance control) and/or can add gain to the rf output signal 165.

As described herein, the mixer 816 performs its function at a low power level so that the implementation of the appropriate signal processing may be integrated into its own single monolithic IC 840. The gain can be subsequently brought up to a high-gain level by the transmit polarization amplifier 210, such that the signal is suitable for uplink to the satellite. For example, some or all components of the DUC 800 are implemented on a first monolithic IC 840, which can be manufactured according to low-power process technologies; and components of the transmit polarization amplifier 210 can be implemented on a second monolithic IC, which can be manufactured according to higher-power process technologies.

Figure 9:
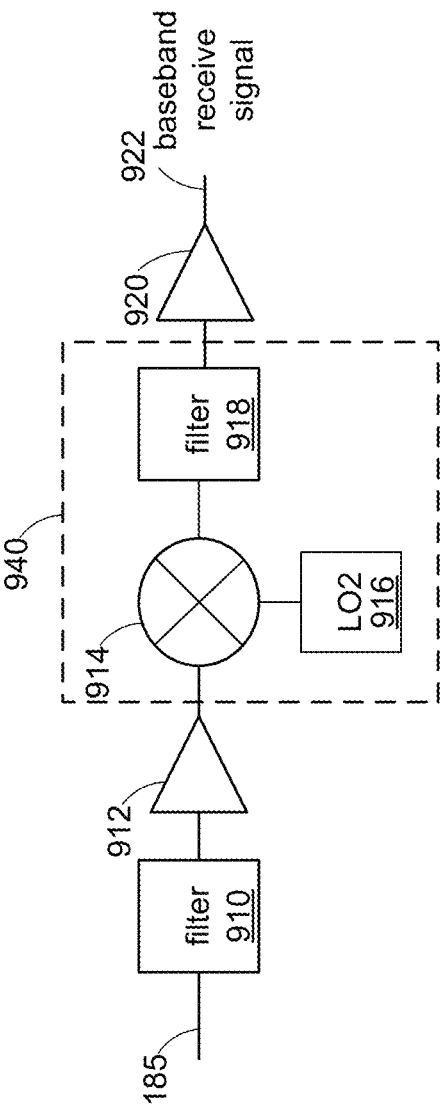
FIG. 9 is a block diagram of a direct down-converter.

FIG. 9 shows a simplified block diagram of an illustrative embodiment of a direct down-converter 900. The illustrated down-converter can be an implementation of the direct down-conversion unit 180 of FIG. 1. It can be seen that the direct down-converter 900 includes only a single conversion stage that converts directly from a satellite rf band to baseband without any intermediate conversion to $f_{if}$. The input to the receive polarization amplifier is a amplified satellite-RF receive signal 185 and is coupled with a filter 910 which is coupled with an amplifier 912. The output of 912 is coupled with a mixer 914 which mixes the signal with LO2 916. The output of the mixer 914 is filtered to remove mixing products which is performed by filter 918. The mixer 914, LO 916 and filter 918 may reside on a single monolithic IC 940. The output of filter 918 drives an amplifier 920. which outputs a baseband receive signal 922.

FIG. 10 is a conventional spectral graph 1000 of the transition of baseband in a superheterodyne transmitter. The amplitude of the signals are shown on axis 1002. The frequency of the signals are shown on axis 1004. Baseband 1010 has a spectrum that is at the base frequency prior to transmission or at the frequency that is produced by a receiver at its last stage. For a voice signal it may be at audio frequency. Baseband 1010 can also be a combination of signals multiplexed into various frequency components. The first stage of the superheterodyne transmitter shifts baseband 1010 in frequency up to an intermediate frequency $f_{if}$ 1020. The second stage of the superheterodyne transmitter shifts the signal at $f_{if}$ 1020 up to rf frequency $f_{rf}$ 1030. The rf frequency $f_{rf}$ 1030 is the frequency that is received by the satellite. For a kA band system, $f_{rf}$ 1030 is between 28 to 41 GHz. The frequency transitions are reversed for a superheterodyne receive, or down conversion spectral shift.

FIG. 11 is a spectral graph 1100 of the transition of baseband for a direct up-converter, such as direct up-converter 800 of FIG. 8. The amplitude of the signals are shown on axis 1102. The frequency of the signals are shown on axis 1104. The input is shifted from baseband 1010 directly to rf frequency $f_{rf}$ 1030 in one stage for a transmit function and is reversed for a receive function.

Figure 12:
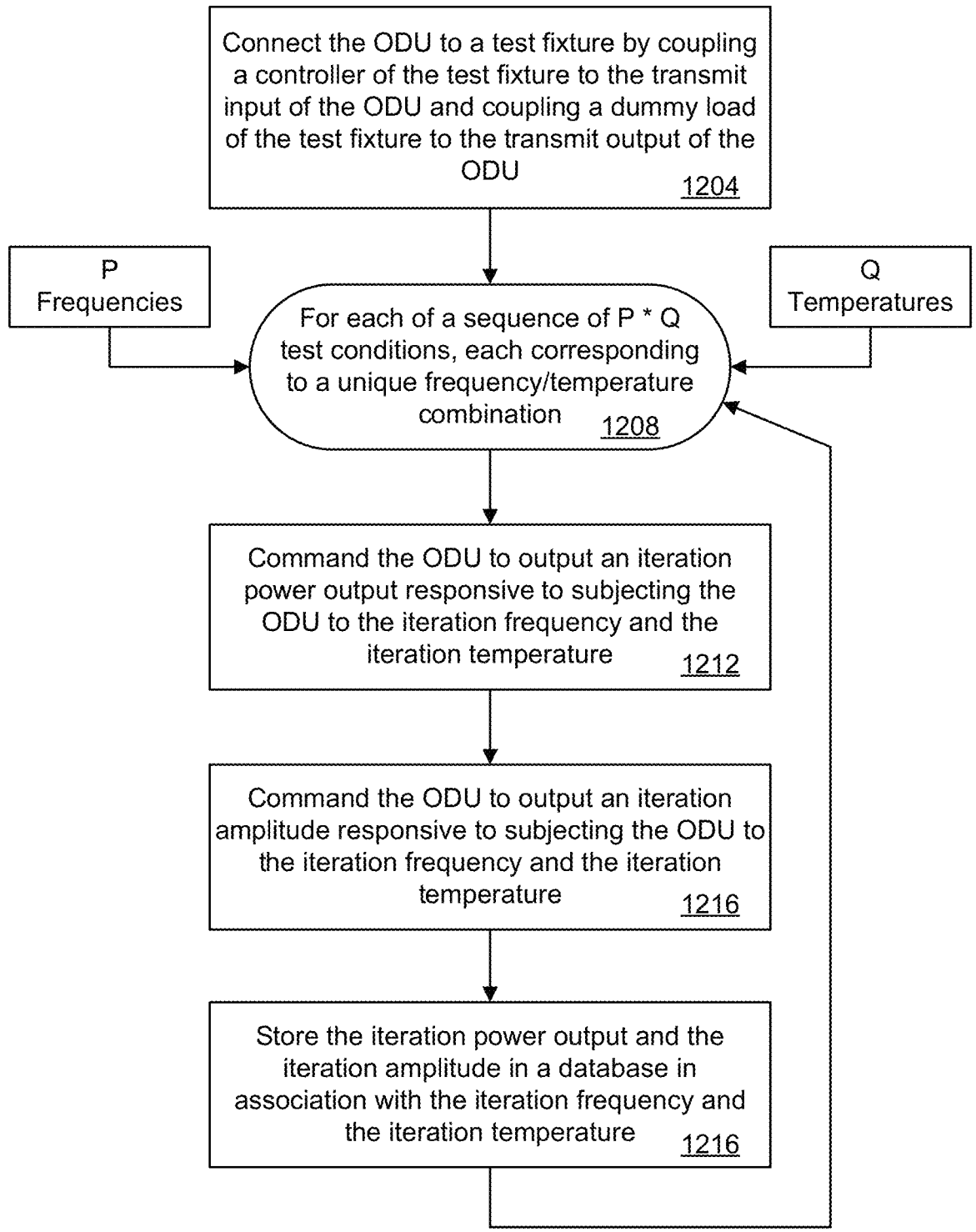
FIG. 12 is a flow diagram of an illustrative method for characterizing an outdoor unit (ODU) for a VSAT.

FIG. 12 is a flow diagram of an illustrative method 1200 for characterizing an outdoor unit (ODU) for a very small aperture terminal (VSAT), according to various embodiments. Embodiments of the method 1200 can be performed in context of an ODU, such as described herein. In particular, embodiments can be performed with an ODU configured to operate in a calibration mode or in an operational mode. As described herein, the ODU is configured to convert a baseband transmit signal received via a transmit input of the ODU into a low-power satellite-RF transmit signal by direct up-conversion (e.g., by a DUC). The ODU is further configured to convert the low-power satellite-RF transmit signal to an uplink signal by applying circular polarization and high gain (e.g., by a transmit polarization control unit). The ODU is further configured to output the uplink signal via a transmit output. As described herein, the entire transmit and receive paths are contained within the ODU when manufactured. For example, as shown in FIG. 1, the modem 150, DUC 160, DDC 180, transmit polarization control unit 170, and receive polarization unit 190 are all implemented within the ODU. As such, it is possible to characterize rf properties of the transmit and receive paths in the factory as part of a pre-calibration operation. Then, when the ODU is later installed at a customer premises and is set to an operational mode, the transmit and receive paths can dynamically optimize certain parameters based on the pre-calibration.

Embodiments of the method 1200 can begin at stage 1204 by connecting the ODU to a test fixture by coupling a controller of the test fixture to the transmit input of the ODU and coupling a dummy load of the test fixture to the transmit output of the ODU. The transmit input can be an input to the embedded computer and/or the modem of the ODU. For example, the transmit input may be the input configured to receive data from the IDU. In one implementation, the controller of the test fixture plugs into the ODU in the same manner that an IDU would plug into the ODU (e.g., using an Ethernet cable, or the like). The transmit output can be an output configured to interface with an antenna. For example, the dummy load can couple with the transmit output via a coaxial cable, or in any suitable manner.

As indicated by block 1208, the method 1200 can iterate through stages 1212-1220 for each of a sequence of P*Q test conditions. Each iteration test condition corresponds to a unique combination of an iteration frequency selected by the controller from a range of P frequencies and an iteration temperature selected by the controller from a range of Q temperatures. In one implementation, the controller iterates sequentially through the P frequencies; and for each frequency, the controller iterates sequentially through the Q temperatures to implement the P*Q test conditions. In another implementation, the controller iterates sequentially through the Q temperatures; and for each temperature, the controller iterates sequentially through the P frequencies to implement the P*Q test conditions.

For each test condition, at stage 1212, the method 1200 can command the ODU (e.g., by the controller) to output an iteration power output responsive to subjecting the ODU (e.g., by the test fixture) to the iteration frequency and the iteration temperature. For each test condition, at stage 1216, the method 1200 can command the ODU (e.g., by the controller) to output an iteration amplitude responsive to subjecting the ODU (e.g., by the test fixture) to the iteration frequency and the iteration temperature. For each test condition, at stage 1220, the method 1200 can store the iteration power output and the iteration amplitude in a database in association with the iteration frequency and the iteration temperature. For example, P*Q iteration power outputs are stored and P*Q iteration amplitudes are stored. The iteration power outputs and iteration amplitudes can be stored in any suitable manner, for example, as vectors, as a lookup table, as a relational database, as a state machine, etc.

In some implementations, the storing at stage 1220 includes loading the database in the embedded computer (e.g., or in a data store in communication with the modem). In some such implementations, the modem and the direct up-conversion unit can be configured, during operation of the ODU in the operational mode, to dynamically derive an optimal power setting based on the database and responsive to detecting an operating frequency and operating temperature. In some such implementations, the modem and the direct up-conversion unit are configured, during operation of the ODU in the operational mode, to dynamically derive an optimal predistortion setting based on the database and responsive to detecting an operating frequency and operating temperature.

Figure 13:
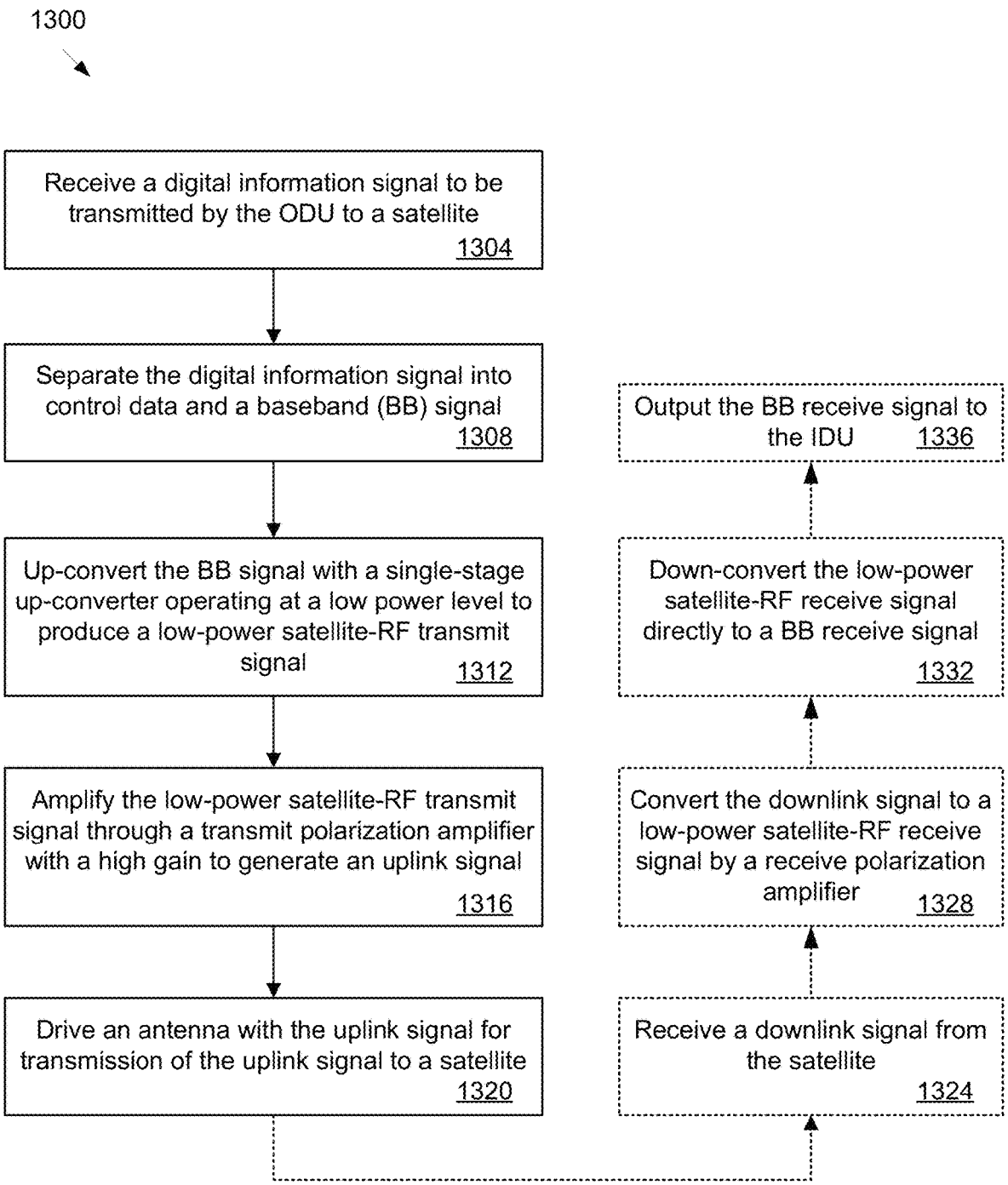
FIG. 13 is a flow diagram of an illustrative method for operating an ODU of a VSAT.

FIG. 13 is a flow diagram of an illustrative method 1300 for operating an outdoor unit (ODU) of a very small aperture terminal (VSAT), according to various embodiments. Embodiments of the method 1300 begin at stage 1304 by receiving (e.g., from an indoor unit (IDU)) a digital information signal to be transmitted by the ODU to a satellite. At stage 1308, embodiments separate the digital information signal into control data and a baseband (BB) signal. At stage 1312, embodiments upconvert the BB signal with a single-stage up-converter operating at a low power level to produce a low-power satellite-RF transmit signal.

At stage 1316, embodiments amplify the low-power satellite-RF transmit signal through a transmit polarization amplifier with a high gain to generate an uplink signal. The uplink signal has a circular polarization selected based on applying a control signal to the transmit polarization amplifier to select one of two outputs of the transmit polarization amplifier wherein each output of the transmit polarization amplifier corresponds to a respective complementary polarization orientation. In some embodiments, the high gain of the transmit polarization amplifier is greater than 27 dB. In some embodiments, the selecting the one of two outputs of the transmit polarization amplifier drives a respective one of two inputs of a polarizing orthomode transducer (OMT); and the driving the antenna comprises driving the antenna with an output of the polarizing OMT. In some such embodiments, driving a first of the two inputs of the polarizing OMT causes the circular polarization orientation to be left hand circular polarization (LHCP); and driving a second of the two inputs of the polarizing OMT causes the circular polarization orientation to be right hand circular polarization (RHCP).

At stage 1320, embodiments drive an antenna with the uplink signal for transmission of the uplink signal to a satellite.

Some embodiments of the method 1300 further include, at stage 1324, receiving a downlink signal from the satellite. In such embodiments, at stage 1328, the method 1300 can convert the downlink signal to a amplified satellite-RF receive signal by a receive polarization amplifier. In such embodiments, at stage 1332, the method 1300 can down-convert the amplified satellite-RF receive signal directly to a BB receive signal. In such embodiments, at stage 1336, the method 1300 can output the BB receive signal to the IDU.

One of ordinary skill in the art will appreciate that various features and aspects of the disclosure can be changed, modified, and manipulated without departing from the scope of this disclosure.

In the foregoing specification, embodiments of the disclosure have been described with reference to numerous specific details that can vary from implementation to implementation. The specification and drawings are, accordingly, to be regarded in an illustrative rather than a restrictive sense. The specific details of particular embodiments can be combined in any suitable manner without departing from the spirit and scope of embodiments of the disclosure.

Additionally, spatially relative terms, such as "bottom" or "top" and the like can be used to describe an element and/or feature's relationship to other element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "and/or," as used herein, may include a variety of meanings that also are expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter is not limited to the particular examples disclosed, but that such claimed subject matter may also include all aspects falling within the scope of appended claims, and equivalents thereof.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An outdoor unit (ODU) of a very small aperture terminal (VSAT) comprising:
   a modem configured to communicate with an indoor unit (IDU) to receive a baseband (BB) transmit signal;
   a transmit path to output an uplink signal to a satellite, the transmit path comprising:
      a direct up-converter (DUC) coupled with the modem to convert the BB transmit signal to a satellite-RF transmit signal; and
      a transmit polarization amplifier coupled with the DUC to convert the satellite-RF transmit signal to the uplink signal by applying circular polarization; and
   a receive path to receive a downlink signal from the satellite, the receive path comprising:
      a receive polarization amplifier to convert the downlink signal to an amplified satellite-RF receive signal; and
      a direct down-converter (DDC) coupled with receive polarization amplifier to convert the amplified satellite-RF receive signal to a BB receive signal and to output the BB receive signal to the modem.

2. The outdoor unit of claim 1 wherein the transmit polarization amplifier applies a gain of at least 29 dB.

3. The outdoor unit of claim 1 wherein the DUC is implemented on a first monolithic IC and the transmit polarization amplifier is implemented on a second monolithic IC separate from the first monolithic IC.

4. The outdoor unit of claim 1 further comprising:
   an orthomode transducer (OMT) to integrate the transmit polarization amplifier and the receive polarization amplifier.

5. The outdoor unit of claim 1 wherein the DUC and DDC are implemented on a same monolithic IC.

6. The outdoor unit of claim 1 wherein the DUC converts based on calibration information previously generated by a characterization process and stored at the modem.

7. The outdoor unit of claim 1 wherein the transmit polarization amplifier is to apply the circular polarization by selecting a circular polarization orientation based on transmit control signals.

8. The outdoor unit of claim 1 wherein the transmit polarization amplifier comprises:
   a first Lange coupler that steers a signal through one of two series of gain stages; and
   a second Lange coupler to steer the output of the one of two series of gain stages to one of two polarization outputs.

9. The outdoor unit of claim 1 wherein the uplink signal is at Ka band signal.

10. An outdoor unit (ODU) of a very small aperture terminal (VSAT) comprising:
   a modem configured to communicate with an indoor unit (IDU) to receive a baseband (BB) transmit signal;
   a transmit path to output an uplink signal to a satellite, the transmit path comprising:
      a direct up-converter (DUC) coupled with the modem to convert the BB transmit signal to a satellite-RF transmit signal; and
      a transmit polarization amplifier coupled with the DUC to convert the satellite-RF transmit signal to the uplink signal by applying circular polarization; and
   an embedded computer, wherein the modem communicates with the IDU via the embedded computer.

11. The outdoor unit of claim 10 wherein:
   the modem provides the BB transmit signal to the DUC; and
   the embedded computer provides transmit control signals to the DUC.

12. A method of characterizing an outdoor unit (ODU) for a very small aperture terminal (VSAT), the ODU configured to operate in a calibration mode or in an operational mode, to convert a baseband transmit signal received via a transmit input of the ODU into a satellite-RF transmit signal by direct up-conversion, to convert the satellite-RF transmit signal to an uplink signal by applying circular polarization, and to output the uplink signal via a transmit output, the method comprising:
   connecting the ODU to a test fixture by coupling a controller of the test fixture to the transmit input of the ODU and coupling a dummy load of the test fixture to the transmit output of the ODU; and
   iteratively, for each of a sequence of P*Q test conditions, each iteration test condition corresponding to a unique combination of an iteration frequency selected by the controller from a range of P frequencies and an iteration temperature selected by the controller from a range of Q temperatures:
      commanding the ODU, by the controller, to output an iteration power output responsive to subjecting the ODU, by the test fixture, to the iteration frequency and the iteration temperature;
      commanding the ODU, by the controller, to output an iteration amplitude responsive to subjecting the ODU, by the test fixture, to the iteration frequency and the iteration temperature; and
      storing the iteration power output and the iteration amplitude in a database in association with the iteration frequency and the iteration temperature.

13. The method of claim 12 wherein:
   the storing comprises loading the database in a modem of the ODU; and
   the modem is configured, during operation of the ODU in the operational mode, to dynamically derive an optimal power setting based on the database and responsive to detecting an operating frequency and operating temperature.

14. The method of claim 12 wherein:
   the storing comprises loading the database in a modem of the ODU; and
   the modem is configured, during operation of the ODU in the operational mode, to dynamically derive an optimal predistortion setting based on the database and responsive to detecting an operating frequency and operating temperature.

15. A method of operating an outdoor (ODU) unit of a very small aperture terminal (VSAT), the method comprising:
   receiving, from an indoor unit (IDU), a digital information signal to be transmitted by the ODU to a satellite;
   separating the digital information signal into control data and a baseband (BB) signal;
   up-converting the BB signal with a single-stage up-converter operating at a low power level to produce a satellite-RF transmit signal;
   amplifying the satellite-RF transmit signal through a transmit polarization amplifier to generate an uplink signal, the uplink signal having a circular polarization selected based on applying a control signal to the transmit polarization amplifier to select one of two outputs of the transmit polarization amplifier wherein each output of the transmit polarization amplifier corresponds to a respective complementary polarization orientation;

driving an antenna with the uplink signal for transmission of the uplink signal to the satellite;

receiving a downlink signal from the satellite;

converting the downlink signal to an amplified satellite-RF receive signal by a receive polarization amplifier;

down-converting the amplified satellite-RF receive signal directly to a BB receive signal; and outputting the BB receive signal to the IDU.

16. The method of claim 15 wherein a gain of the transmit polarization amplifier is greater than 29 dB.

17. The method of claim 15 wherein:

the selecting the one of two outputs of the transmit polarization amplifier drives a respective one of two inputs of a polarizing orthomode transducer (OMT); and the driving the antenna comprises driving the antenna with an output of the polarizing OMT.

18. The method of claim 17 wherein:

driving a first of the two inputs of the polarizing OMT causes the circular polarization orientation to be left hand circular polarization (LHCP); and driving a second of the two inputs of the polarizing OMT causes the circular polarization orientation to be right hand circular polarization (RHCP).

* * * * *